Figures 1, 2, 3, 4, 5, 6:
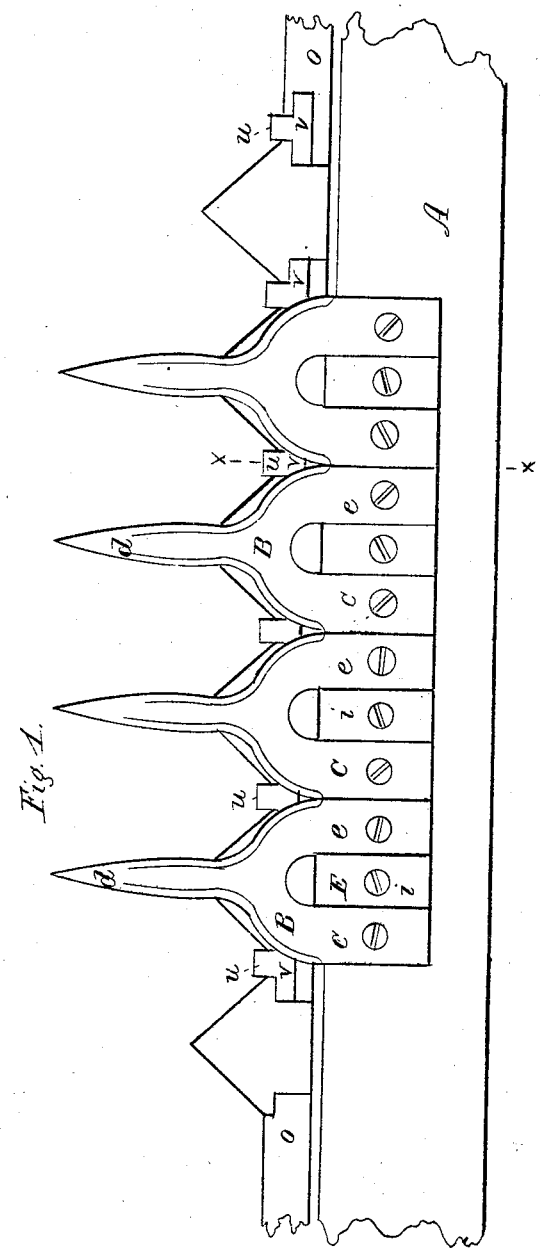

P. Manny.
Harvester Cutter.

No. 18052.  Patented Aug. 25. 1857.

UNITED STATES PATENT OFFICE.

PELLS MANNY, OF WADDAM'S GROVE, ILLINOIS.

IMPROVEMENT IN THE CUTTING APPARATUS OF HARVESTERS.

Specification forming part of Letters Patent No. 18,052, dated August 25, 1857.

*To all whom it may concern:*

Be it known that I, PELLS MANNY, of Waddam's Grove, in the county of Stephenson and State of Illinois, have invented a new and useful Improvement in the Cutting Apparatus of Harvesting-Machines; and I do hereby declare that the following is a full, clear, and exact description of my said invention, reference being had to the accompanying drawings, in which—

Figure 1 represents a plan of a cutting apparatus constructed upon the principles of my invention. Fig. 2 is a plan of the upper member of the finger detached from the finger-bar, and Fig. 3 is a side view of the same. Fig. 4 is a plan of the lower member of the finger, and Fig. 5 a side view of the same; and Fig. 6 is a cross-section of the cutting apparatus at the line $x\ x$ of Fig. 1.

The object of my invention is to produce a cutting apparatus which shall not be liable to obstruction by dirt or by wire-grass or uncut stalks; and my invention consists, first, in constructing the fingers of the cutting apparatus of two members, which are not connected together, but are secured in juxtaposition upon the finger-bar of the machine in such manner that one member overlaps the sickle and the other underlaps it without meeting each other, and that ample space is left for the working out of dirt.

The second portion of my invention consists in forming recesses in those portions of the fingers which embrace the stock of the sickle, and in using, in connection therewith, supplementary inclined cutters or scrapers, which project in opposite directions above and below the plane in which the cutting-edges of the sickle vibrate, and traverse the recesses in the fingers, thus severing any wire-grass or uncut stalks that may lodge in the slot or space in the fingers through which the sickle vibrates, and expelling them therefrom, together with any dirt that may accumulate therein.

The accompanying drawings represent my improvement as applied to the finger-bar A of a harvesting-machine. The upper member, B, of each finger is forked at its base, and its two branches $c$ and $e$ are secured to the finger-bar. The point $d$ of this member projects beyond the points of the sickle or cutter, which is scalloped in the usual manner, and the portion which projects beyond the sickle is thickened so as to project below the level of the sickle and protect it from injury. The lower member, E, of the finger extends beneath the sickle, its base $i$ being secured to the finger-bar between the branches of the upper member. It extends forward as far as the points of the sickle, but does not meet the upper member, so that the two are not connected together at any part of their length, and that a space, $s$, is left at the points of the sickle for dirt to work out. This mode of constructing and securing the two members of the finger permits either to be removed and replaced, or to be adjusted to compensate for wear, without disturbing the other member; and as the shorter member forms a back to support the hinder side of the sickle, which is borne against it by the pressure of the grain when the machine is cutting, it wears away more rapidly than the longer member, and the facility with which it can be adjusted or removed and replaced by a new member is a great advantage. The inner face of that part of the upper member of the finger which is above the stock $o$ of the sickle is recessed upward, as shown at $r$, Fig. 3, and the inner face of the lower member of the finger is recessed downward, as shown at $z$, Fig. 5. These recesses are traversed by the supplementary cutters $v$ and $u$, which are secured to the stock of the sickle and project therefrom. The upper supplementary cutters, $v$, traverse the recesses in the upper members of the fingers, and the lower supplementary cutters, $u$, traverse the recesses in the lower members of the fingers, and cutting the uncut stalks which lodge therein remove them therefrom, so that the hinder ends of the slots or spaces in the fingers in which the sickle vibrates are kept clean, both above and below the scalloped edges, which effect the cutting of the grain.

Having thus described my improved cutting apparatus, what I claim as my invention, and desire to secure by Letters Patent, is—

1. The method of constructing the fingers of the cutting apparatus of harvesting-machines of two members, B and E, and securing them upon the finger-bar in the manner as herein set forth.

2. The recesses $r$ and $z$ in the inner faces of the fingers, in combination with the supplementary inclined cutters $u$ and $v$, projecting above and below the sickle, substantially as herein set forth.

In testimony whereof I have hereunto subscribed my name.

PELLS MANNY.

Witnesses:
A. MARCELLUS,
E. S. RENWICK.